(12) United States Patent
Stecker et al.

(10) Patent No.: US 10,830,327 B2
(45) Date of Patent: Nov. 10, 2020

(54) DRIVE UNIT PINION AND METHOD OF INSTALLATION

(71) Applicant: Ford Global Technologies, LLC, Dearborn, MI (US)

(72) Inventors: Kurt Stecker, Roseville, MI (US); Robert Thomas Kraus, Shelby Township, MI (US); Bryan Leslie Crozier, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 16/254,029

(22) Filed: Jan. 22, 2019

(65) Prior Publication Data

US 2020/0232548 A1 Jul. 23, 2020

(51) Int. Cl.
| | | |
|---|---|---|
| *F16H 48/42* | (2012.01) | |
| *F16H 48/08* | (2006.01) | |
| *F16H 57/023* | (2012.01) | |
| *F16C 43/04* | (2006.01) | |
| *F16C 19/36* | (2006.01) | |
| *F16H 48/38* | (2012.01) | |

(52) U.S. Cl.
CPC ........... *F16H 48/42* (2013.01); *F16C 19/364* (2013.01); *F16C 43/04* (2013.01); *F16H 48/08* (2013.01); *F16H 57/023* (2013.01); *F16C 2326/06* (2013.01); *F16H 2048/087* (2013.01); *F16H 2048/382* (2013.01); *F16H 2048/423* (2013.01)

(58) Field of Classification Search
CPC .... F16H 48/08; F16H 48/42; F16H 2048/087; F16H 2048/382; F16H 2048/423; F16C 19/364; F16C 43/04; F16C 2326/06; F16C 35/06; F16C 2226/12; F16C 2226/36
USPC .......................................................... 475/220
See application file for complete search history.

(56) References Cited

U.S. PATENT DOCUMENTS

| | | | | |
|---|---|---|---|---|
| 3,704,498 | A * | 12/1972 | Rundt .................. | F16C 19/364 |
| | | | | 29/898.062 |
| 5,882,122 | A * | 3/1999 | Noguchi ................ | B82Y 10/00 |
| | | | | 384/490 |
| 6,010,247 | A * | 1/2000 | Mouri ..................... | F16C 19/06 |
| | | | | 384/501 |
| 6,770,007 | B2 | 8/2004 | Fox | |
| 7,056,029 | B2 * | 6/2006 | Mori ...................... | F16C 19/18 |
| | | | | 384/517 |

(Continued)

FOREIGN PATENT DOCUMENTS

WO          2018187299 A1    10/2018

*Primary Examiner* — Leslie A Nicholson, III
(74) *Attorney, Agent, or Firm* — Vincent Mastrogiacomo; Brooks Kushman P.C.

(57) ABSTRACT

A drive unit includes a housing and a pinion having a head and a shaft. The shaft extends through a pinion-support portion of the housing. A tail bearing supports the shaft and has an outer race fixed to the pinion-support portion and an inner race received on the shaft. The inner race is brazed to the shaft. The drive unit may be assembled by installing a tail-bearing cup and a head-bearing cup in the housing and inserting the pinion in the housing with the shaft extending through the cups. The method further includes installing a tail-bearing cone onto the shaft to be seated on the tail-bearing cup and urging the cups toward each other. The method also includes brazing the tail-bearing cone to the shaft while the cups are urged toward each other.

19 Claims, 5 Drawing Sheets

(56) References Cited

U.S. PATENT DOCUMENTS

| | | | |
|---|---|---|---|
| 8,622,621 B2 * | 1/2014 | Kosaka | F16C 35/06 |
| | | | 384/445 |
| 9,366,291 B2 * | 6/2016 | Chang | B23K 26/28 |
| 10,208,846 B2 * | 2/2019 | Chinitz | F16H 48/42 |
| 2013/0077192 A1 | 3/2013 | Kosaka et al. | |
| 2018/0259052 A1 | 9/2018 | Chinitz | |

* cited by examiner

DRIVE UNIT PINION AND METHOD OF INSTALLATION

TECHNICAL FIELD

This disclosure relates to the assembly of pinions in drive units and more specifically to a drive unit in which the tail bearing is brazed to a shaft of the pinion to simplify preloading of the bearing during assembly. Also disclosed is a method of assembling a drive unit.

BACKGROUND

Motor vehicles may include a drive unit as part of a driveline system. The drive unit includes a differential that transmits torque produced by an engine to driven wheels of the vehicle. The differential allows the driven wheels to rotate at different speeds relative to each other. This allows the outer wheel to rotate faster than the inner wheel when the vehicle is turning.

A typical drive unit includes a ring gear meshing with a pinion gear that is fixed to a driveshaft. A differential carrier is fixed to the ring gear and is supported for rotation within a housing of the drive unit. The carrier supports a pair of side gears and a pair of spider gears in meshing engagement with the side gears. The side gears are driveably connected to the driven wheels. The spider gears transmit torque from the carrier to the side gears to propel the vehicle.

SUMMARY

According to one embodiment, a method of assembling a drive unit includes installing a tail-bearing cup and a head-bearing cup in a housing and inserting a pinion in the housing with a shaft of the pinion extending through the cups. The method further includes installing a tail-bearing cone onto the shaft to be seated on the tail-bearing cup and urging the cups toward each other. The method also includes brazing the tail-bearing cone to the shaft while the cups are urged toward each other.

According to another embodiment, a method of assembling a drive unit includes installing cups of head and tail bearings onto first and second seats of a housing, respectively, and installing a cone of the head bearing onto a shaft of a pinion. The method further includes inserting the pinion in the housing with the shaft extending through the cups and with the cone of the head bearing seated on the cup of the head bearing and includes installing a cone of the tail bearing onto the shaft to be seated on the cup of the tail bearing. The method also includes fixturing the housing in a press with a driver of the press contacting the cone of the tail bearing and extending the driver to urge the tail bearing towards the head bearing. The method further includes brazing the cone of the tail bearing to the shaft while the driver is extended.

According to another embodiment, a drive unit includes a housing and a pinion having a head and a shaft. The shaft extends through a pinion-support portion of the housing. A tail bearing supports the shaft and has an outer race fixed to the pinion-support portion and an inner race received on the shaft. The inner race is brazed to the shaft.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle may include front wheels and rear wheels. The vehicle may be rear-wheel drive in which the rear wheels are powered by a powertrain including an engine, an electric motor, or combinations thereof. A driveshaft transmits power produced by the powertrain to the rear wheels via a drive unit and left and right half shafts. An accelerator pedal allows the driver of the vehicle to control the power output of the powertrain. The vehicle could also be front-wheel drive, all-wheel drive, or four-wheel-drive, in which case, the front drivetrain may include an associated drive unit.

Figure 1:
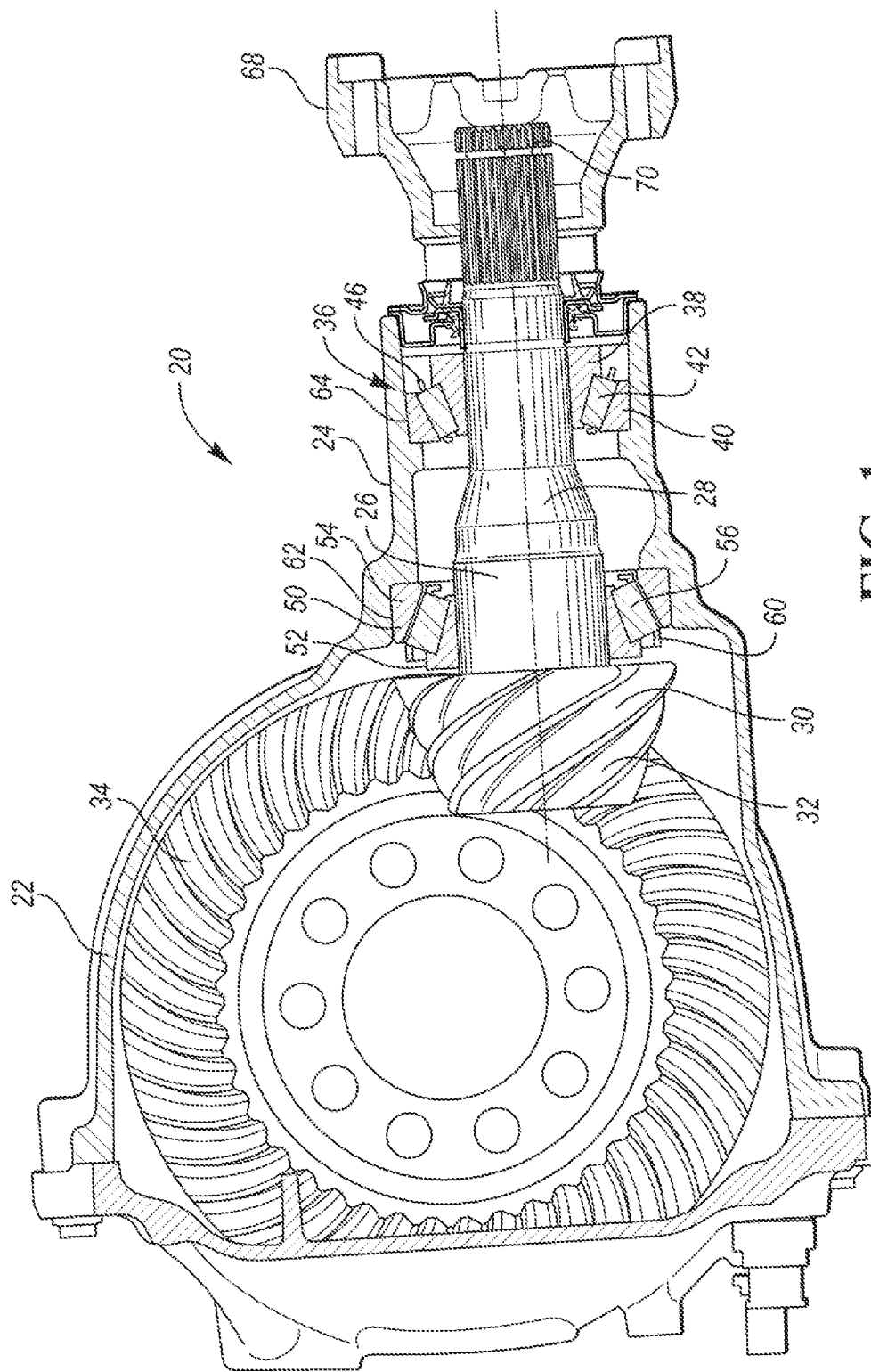
FIG. 1 is a side cross-sectional view of a drive unit with some components omitted for illustrative purposes.

Referring to FIG. 1, an example drive unit 20 includes a housing 22 having a pinion-support portion 24. A pinion gear 26 extends through the pinion-support portion 24. The pinion includes shaft 28 and a head 30. The head 30 defines gear teeth 32 configured to mesh with a ring gear 34. The ring gear 34 is fixed to a differential carrier (not shown) that is supported for rotation within the housing 22. The carrier may support a pair of opposing first and second side gears and a pair of opposing first and second spider gears in meshing engagement with the side gears. A shaft may interconnect the spider gears. The first side gear is configured to transmit torque to a left half shaft (or axle shaft) and the second side gear is configured to transmit torque to a right half shaft (or axle shaft). The half shafts may be splined to the side gears. Of course other types of differential mechanisms are known and the embodiments of this disclosure can be used with these other types of differentials.

The pinion 26 is supported for rotation within the pinion-support portion 24 by a tail bearing 36 and a head bearing 50. The tail bearing 36 may include a cone 38 (inner race) and a cup 40 (outer race) that circumscribes the cone 38. The cone 38 may include rolling elements 42, e.g. needles, and a cage 46. The head bearing 50 may include a cone 52 (inner race) and a cup 54 (outer race) that circumscribes the cone 52. The cone 52 may include rolling elements 56, e.g., needles, and a cage 60.

The outer race 40 of the tail bearing 36 is seated on a tail-bearing seat 64 defined by the housing 22, and the inner race 38 is received on the shaft 28. The outer race 54 of the head bearing 50 is seated on a head-bearing seat 62, and the inner race 52 is received on the shaft 28 near the pinion head 30. The inner race 52 may be interference fit (press fit) to the shaft 28. The bearings 36 and 50 cooperate to retain the pinion 26 to the housing 22 both axially and radially to support the pinion 26 for rotation and to react the gear separation loads. A yoke 68 is attached to the tail 70 of the shaft 28, such as by a spine and snap ring, and is used to attach the pinion 26 to a driveshaft. A U-joint or CV joint may be interposed between the yoke 68 and the driveshaft.

Proper operation of the drive unit requires the bearings to be preloaded. Bearing preload is a force, e.g., axial or thrust, that is applied to the bearing to remove excess play. Unloaded bearings have clearance between their components to facilitate assembly and allow for free movement. This clearance is larger than desired during operation. Preloading reduces this clearance to ensure proper operation of the bearings. Bearing preloading requires precision: too much or not enough results in reduced bearing life. For example, excessive preload creates an interference fit between the races and the rolling elements causing excessive wear and heat generation, and insufficient preload results in bearing play in which the rolling elements can slide or skid within the races rather than roll. In the drive unit context, improper bearing preload can cause noise, vibration, and other undesirable outcomes.

Figure 2:
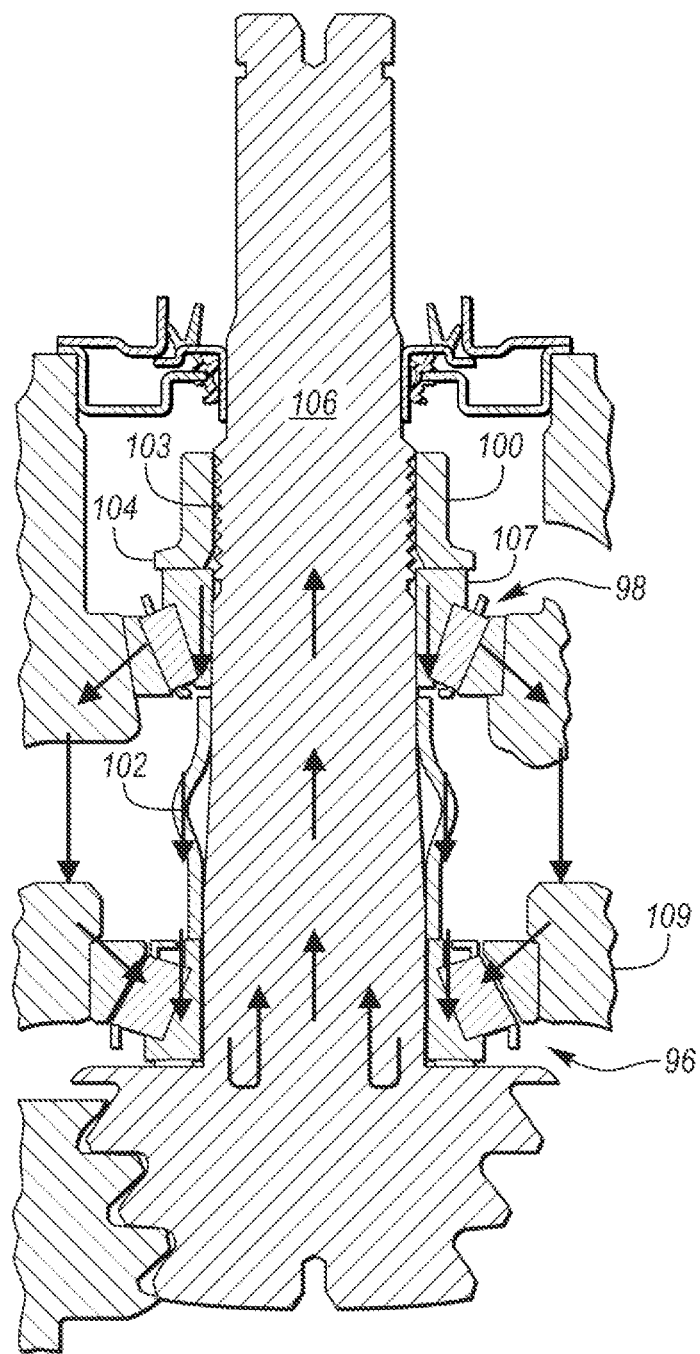
FIG. 2 is a cross-sectional view of a prior-art drive unit showing preloading of the pinion bearings.

Referring to FIG. 2 (prior art), for years the head and tail bearings 96, 98 have been preloaded using a drive nut 100 and a collapsible spacer 102 that acts between the inner races of the bearings 96, 98. The drive nut 100 is screwed onto threads 103 of the shaft 106 of the pinion. The drive nut 100 includes a flange end 104 that engages with the inner race 107 of the tail bearing 98. Torque, typically applied by a torque wrench, rotates the drive nut 100 inducing tension in the shaft 106 and compression in the collapsible spacer 102 and housing 109 to preload the bearings 96, 98.

The pinion system is designed to have a specific axial preload. Inducing this preload with a drive nut requires calculating the appropriate bearing drag torque that corresponds with the desired axial preload force. This can be imprecise. Moreover, small changes in torque on the drive nut result in large changes in the axial force. For example, torqueing the drive nut 100 to 16 inch-pounds results in 1000 pounds of axial force, and torqueing the drive nut 100 to 29 inch-pounds results in 2000 pounds of axial force. Under torqueing the nut 100 results in insufficient preload of the bearings which may lead to any one of the above-enumerated problems. Over torqueing the nut 100, in addition to the above-described bearing issues, over buckles the spacer 102 rendering it useless. An over buckled spacer 102, must be replaced with a new one and the whole preloading process must then start anew.

Other aspects of the prior-art design can create additional problems. For example, the pinion nut flange end 104 has inherent variability in its surface profile and is perpendicular to the pinion shaft 106, which may cause uneven loading of the shaft after the nut is fully tightened. This can cause distortion of the shaft resulting in imbalance and run-out of the assembly. Imbalance and run-out may create noise, vibration, and harshness issues as well as reduce durability. The nut and thread design increase costs as threads must be formed onto the shaft 106 and the nut 100. The nut 100 and the spacer 102 are additional components that increase costs. The increased cost of the drive nut 100 are compounded by the fact that the nut 100 and the spacer 102 are typically engineered for a particular assembly. The drive nut 100 may also become unscrewed during operation of the vehicle resulting in a loss of preload.

Despite these problems, methods of preloading bearing of a drive-unit pinion has remained unchanged for decades and the industry has been unable to develop a viable solution that solves these and other problems related to bearing preload in drive units. The following figures and related text describe a new solution for preloading the bearings of a drive unit pinion that solve at least the above-noted problems and provide a solution to a long felt need in the automotive industry as well as any other industry that utilizes drive units.

The bearings associated with a drive unit pinion are preloaded by sliding the tail bearing towards the head and then retaining the tail-bearing cone to the shaft. In the prior art, the threaded nut both slid and retained the tail-bearing cone. In one or more embodiments, a press, or equivalent device, slides the tail bearing 36 on the shaft 28 to an axial preload condition and then the cone 38 is affixed to the shaft 28. The cone 38 may be brazed to the shaft 28.

Figure 3:
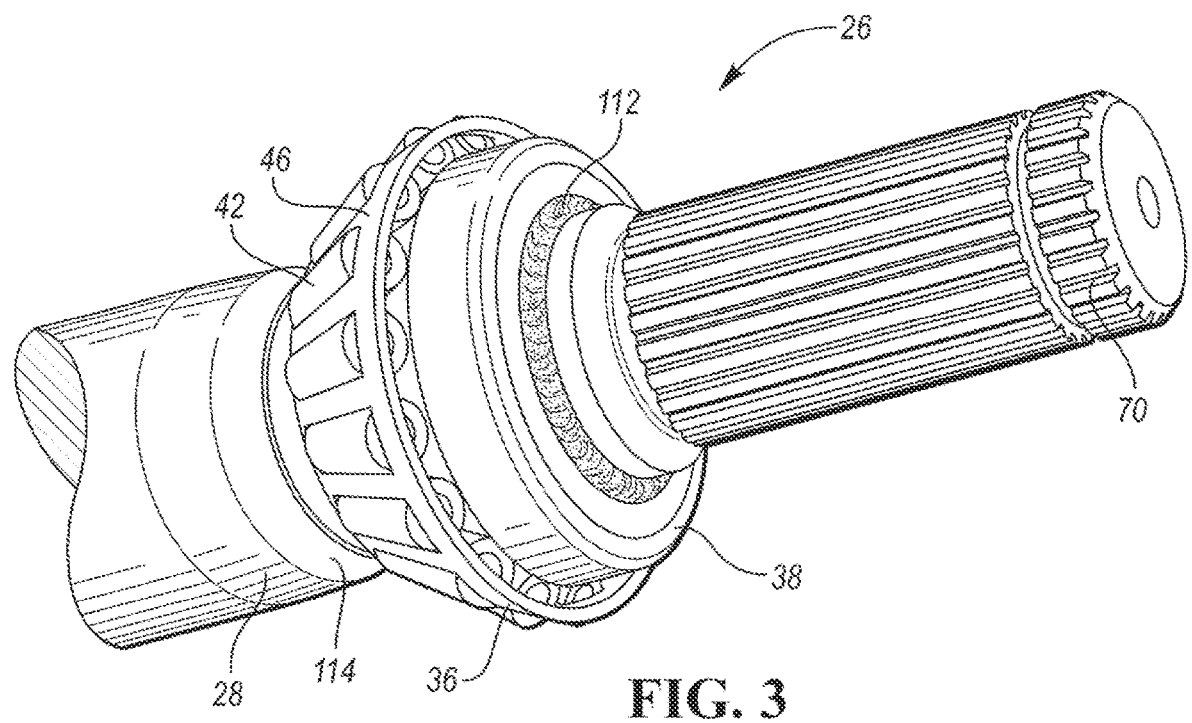
FIG. 3 is a perspective view of a drive-unit pinion with an inner race of a tail bearing brazed to a shaft of the pinion.
Figure 4:
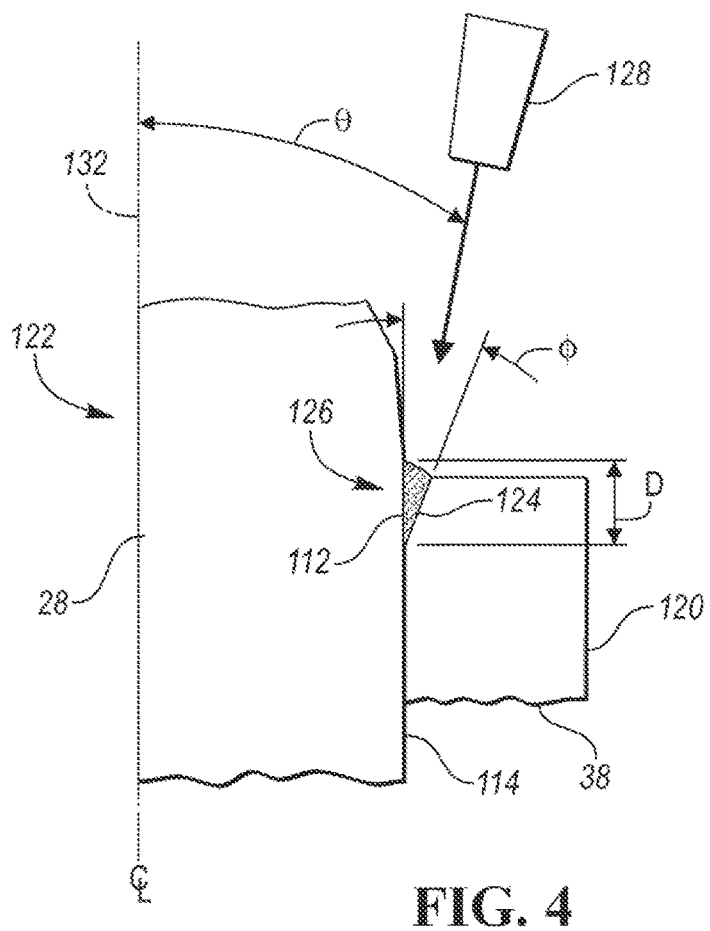
FIG. 4 is a diagrammatical cross-sectional view of a tail bearing brazed to a pinion shaft.

Referring to FIGS. 1, 3 and 4, a braze 112 affixes the cone 38 to an outer surface 114 of the shaft 28 such that the bearing 36 is preloaded. Brazing is the preferred method of attaching the cone 38 to the shaft 28 in most applications because the bearing cone and the shaft are hardened steel, e.g., carbonized. A braze adhesion joint is better suited than a steel-to-steel fusion weld in joining harden steel components such as the cone 38 and the shaft 28. It is impractical to weld hardened steel because the components tend to crack. Welding, however, is not explicitly disclaimed in all applications. For example, welding may be practical when the bearing cone and the shaft are formed of a more mild steel or are tempered or machined prior to welding. In most automotive applications through, hardened steel is required to carry the torque and brazing is the joining means of choice.

The braze 112 may be formed by a laser 128 and may completely encircle the shaft 28 once complete. Alternatively, the braze 112 may be discontinuous around the circumference of the shaft 28. The braze may be a silicon-bronze braze, but other suitable compounds may be used. An interference fit may be provided between the shaft 28 and the cone 38 to supplement the braze 112 thus creating a two-stage joint 122. A relief is provided on the bearing or the shaft to provide an area for the brazing material. For example, a chamfer 124 may be formed on the backside 120 of the cone 38. The chamfer 124 cooperates with the shaft 28 to define a circular pocket 126 configured to receive the brazing material therein. The pocket 126 aides in meeting the desired penetration of the braze to ensure sufficient strength.

The geometry of the braze can be optimized to ensure that sufficient strength is consistently achieved during mass production of the drive unit 20. Parameters to be optimized include the angle ($\theta$) of the laser 128, the angle ($\phi$) of the chamfer 124, and the depth (D) of the braze 112. Equations 1, 2, and 3, may be used as guides to optimize these values for a variety of different drive units. The actual values chosen for any one drive unit may deviate from the exact values calculated by the equations to accommodate other constraints. That is, these equations provide a useful guide for designers but can be deviated from to accomplish other goals while still providing an acceptable braze connection.

The angle of the laser is measured between the centerline 132 of the shaft 28 and the axial center line of the laser 128. Equation 1 may be used to determine the angle of the laser 128 during brazing. The focal point is the laser width at the interface.

$$\theta = \sin^{-1}\left(\frac{0.5 \times \text{Focal Point}}{D}\right) \quad \text{(Eq. 1)}$$

The angle ($\phi$) of the chamfer is measured between the chamfer 124 and the outer surface 114 of the shaft. Equation 2 may be used to determine the angle $\phi$.

$$\phi = 20 \quad \text{(Eq. 2)}$$

The depth D may be calculated by Equation 3, where D=required filler depth; F=maximum load requirement; R=minimum radius of cone inner diameter; and $\tau$=allowable shear stress.

$$D = \frac{F}{2\pi R \tau} \quad \text{(Eq. 3)}$$

Figure 5:
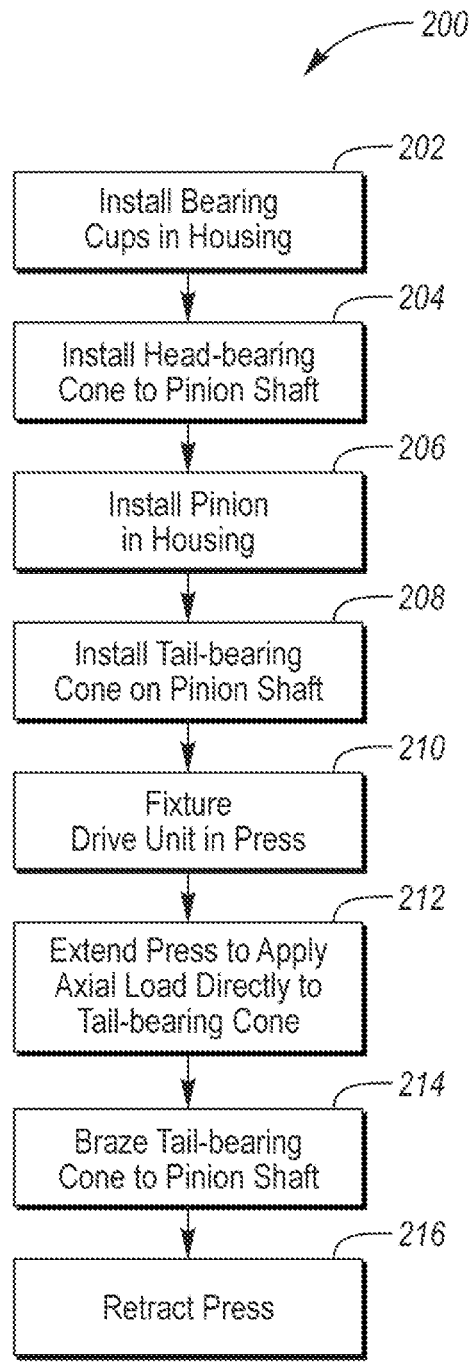
FIG. 5 is a flow chart illustrating a method for assembling a drive unit of the present disclosure.
Figure 6:
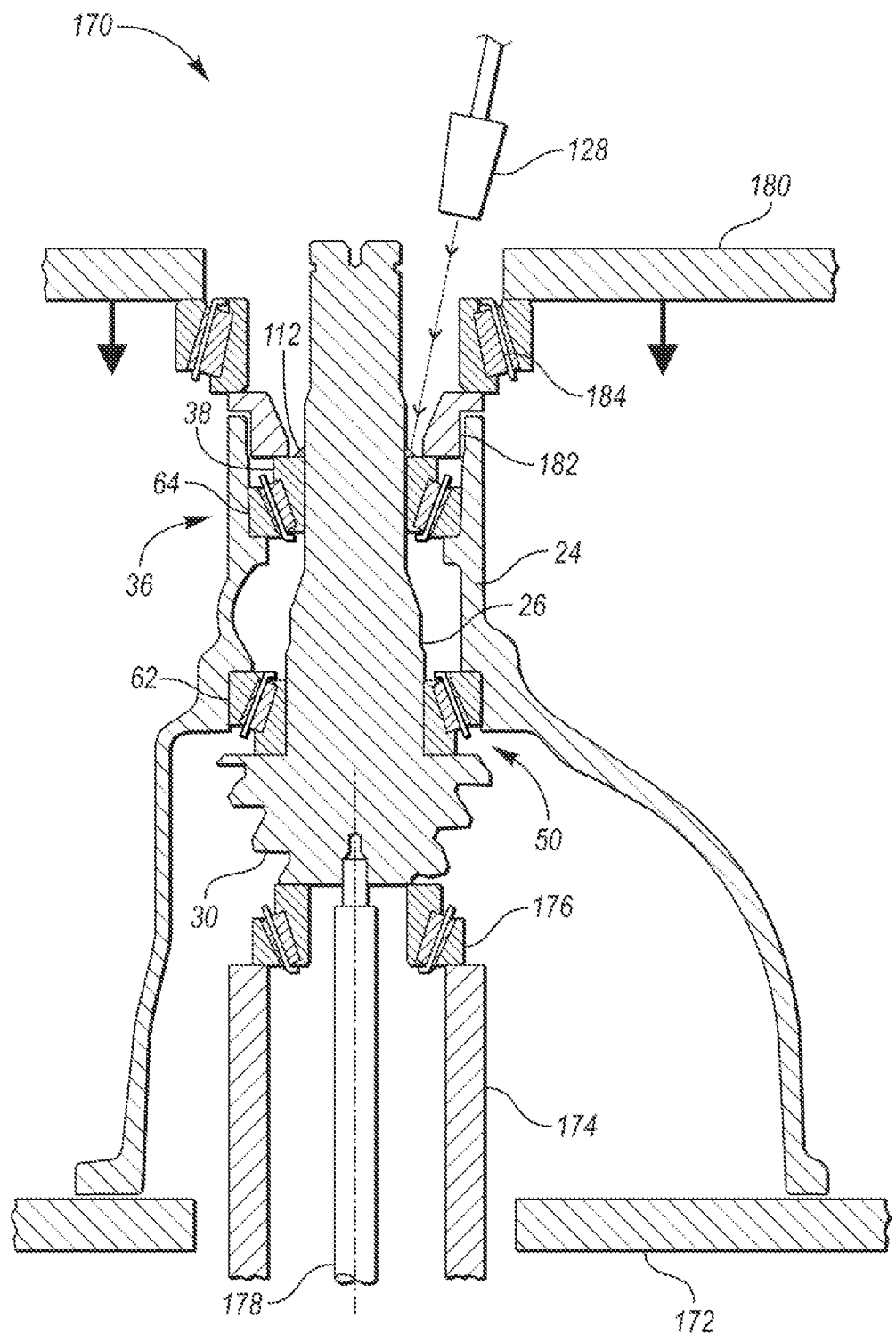
FIG. 6 is a diagrammatical side cross-sectional view of a drive unit mounted in a press configured to preload pinion bearings of the drive unit and preform braze welding.

Now a method of manufacturing a drive unit will be described. For convenience, the method 200 will be described with reference to the drive unit 20. Referring to FIGS. 5 and 6, the method 200 includes installing cups 40, 54 of head and tail bearings onto first and second seats 62, 64 of the housing 22, respectively, at operation 202. The cups may be interference fit to the seats and installed using a pressing operation. At operation 204, the cone 52 of the head bearing 50 is installed onto the shaft 28, which is not yet installed in the housing. The cone 52 may be press fit to the shaft 28. The pinion 26 is now ready to be installed into the pinion-support portion 24 of the housing 22. The pinion 26 is installed by inserting the shaft 28 through the pinion-support portion 24 from the main cavity of the housing 22 at operation 206. The pinion is inserted with the shaft extending through the cups and with the cone 52 of the head bearing roughly seated on the cup 54 of the head bearing. At operation 208, the cone 38 of the tail bearing 36 is inserted onto the shaft 28 from the tail end. The cone 38 is slide on the shaft 28 until the cone 38 (including the rollers and cage) is roughly seated against the cup 40.

After operation 208, the pinion 26 is roughly installed in the housing 22 and the bearings 36, 50 are ready to be preloaded. At operation 210, the drive unit 20 is fixtured in a press 170 as shown in FIG. 6. The press 170 includes a mounting table 172 that loosely supports the housing 22 to prevent housing rotation. A spacer 174 holds a bearing 176 in contact with the head 30. A pinion spindle 178 is connected with the head 30 and is configured to rotate the pinion 26 within the housing. The press 170 may also include an axial driver 180 that is connected with the tail bearing 36 via a spacer 182 and a bearing 184. The spacer 182 contacts the bearing 36 at the cone 38. The pinion 26 is able to be rotated within the press 170 while the axial driver 180 presses the tail bearing 36 towards the head bearing 50. The laser 190 may be integrated with the press 170 (as shown) or may be a separate tool. The axial driver 180 is movable towards the mounting table 172 to slide the tail bearing 36 towards the head bearing 50 to fully seat the bearings and to create a preload force in the system. The cylindrical spacer 174 prevents the pinion 26 from moving axially during the pressing operation.

Once fixturing is complete, the driver 180 is extended to urge the tail-bearing cone 38 towards the head bearing 50 at operation 212. Initially, the cone 38 slides on the shaft 28 to fully seat the bearing 36. (The bearing 50 may also be fully seat during this operation.) Once the bearings fully seat, preloading of the bearings is complete. During the preloading process, the pinion-support portion 24 is compressed and plastically deforms. The seat 64 prevents the bearing 36 from sliding in the housing and a back side of the head 30 prevents the bearing 50 from sliding in the housing. The press 170 is extended until the desired preload it reached. The press 170 directly measures the axial load, which is more accurate than the prior-art torque method. The spindle 178 may rotate the pinion 26 during the pressing operation.

The press driver 180 holds the axial load during brazing. At operation 212, the laser 128 is moved to the proper position and beams light onto the assembly. A feed-wire of brazing material is feed into the focal area of the laser to create the braze 112. The feed-wire assembly may be packaged with the laser 128. The laser 128 may be stationary with the pinion 26 being rotated to create the circular braze 112. Once brazing is complete, the press is retracted at operation 216. The housing 22 rebounds as the press is retracted placing the shaft 28 in tension, which maintains the preload on the bearings. The pinion is now fully installed and other components of the drive unit may be installed, such as the ring gear and the differential assembly.

The method 200 simplifies preloading by directly seating the preload with axial force as opposed to rotational torque. This leads to more consistent results with less defects, which improves manufacturing efficiency and reduces cost.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of assembling a drive unit comprising:
    installing a tail-bearing cup and a head-bearing cup in a housing;
    inserting a pinion in the housing with a shaft of the pinion extending through the cups;
    installing a tail-bearing cone onto the shaft to be seated on the tail-bearing cup; and
    urging the cups toward each other; and while the cups are urged toward each other, brazing the tail-bearing cone to the shaft.

2. The method of claim 1 further comprising releasing the urging so that tension is induced in the shaft.

3. The method of claim 1, wherein the urging includes fitting a press to the tail-bearing cup and extending the press to move the tail-bearing cup towards the head-bearing cup.

4. The method of claim 3 further comprising retracting the press after the brazing is complete.

5. The method of claim 1 further comprising inserting a head-bearing cone onto the shaft of the pinion, wherein the pinion is inserted into the housing such that the head-bearing cone is seated on the head-bearing cup.

6. The method of claim 5, wherein the tail-bearing cup and the head-bearing cup are interference fit to the housing.

7. The method of claim 1, wherein the brazing further includes laser welding silicon bronze to the tail-bearing cone and the shaft.

8. The method of claim 7, wherein the laser is oriented at an angle relative to an axial centerline of the shaft during the brazing, and wherein the angle is based on allowable sheer stress.

9. The method of claim 1 further comprising rotating the pinion during the urging.

10. A drive unit comprising:
   a housing;
   a pinion including a head and a shaft that extends through a pinion-support portion of the housing;
   a tail bearing supporting the shaft and including an outer race fixed to the pinion-support portion and an inner race received on the shaft, wherein the inner race is brazed to the shaft, and an axial length of the braze is based on an inner diameter of the tail bearing.

11. The drive unit of claim 10, wherein the braze is silicon bronze.

12. The drive unit of claim 10, wherein the inner race defines a chamfer cooperating with the shaft to define a pocket for the braze.

13. The drive unit of claim 10, wherein the shaft is free of threads.

14. The drive unit of claim 10, further comprising a differential disposed in the housing and operably coupled to the pinion.

15. The drive unit of claim 14, wherein the differential includes a ring gear in meshing engagement with the pinion.

16. A method of assembling a drive unit comprising:
   installing cups of head and tail bearings onto first and second seats of a housing, respectively;
   installing a cone of the head bearing onto a shaft of a pinion;
   inserting the pinion in the housing with the shaft extending through the cups and with the cone of the head bearing seated on the cup of the head bearing;
   installing a cone of the tail bearing onto the shaft to be seated on the cup of the tail bearing;
   fixturing the housing in a press with a driver of the press contacting the cone of the tail bearing;
   extending the driver to urge the tail bearing towards the head bearing; and
   while the driver is extended, brazing the cone of the tail bearing to the shaft.

17. The method of claim 16 further comprising:
   attaching a pinion driver to the pinion; and
   rotating the pinion driver during the brazing.

18. The method of claim 16, wherein the brazing further includes laser welding silicon bronze to the cone of the tail bearing and the shaft.

19. The method of claim 18, wherein the laser is oriented at an angle relative to an axial centerline of the shaft during the brazing, and wherein the angle is based on allowable sheer stress.

* * * * *